(12) United States Patent
Ono

(10) Patent No.: US 12,237,802 B2
(45) Date of Patent: Feb. 25, 2025

(54) POWER GENERATION SYSTEM

(71) Applicant: NTN Corporation, Osaka (JP)

(72) Inventor: Kouhei Ono, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 18/282,448

(22) PCT Filed: Mar. 10, 2022

(86) PCT No.: PCT/JP2022/010577
§ 371 (c)(1),
(2) Date: Sep. 15, 2023

(87) PCT Pub. No.: WO2022/196517
PCT Pub. Date: Sep. 22, 2022

(65) Prior Publication Data
US 2024/0171099 A1    May 23, 2024

(30) Foreign Application Priority Data
Mar. 19, 2021   (JP) ................. 2021-045425

(51) Int. Cl.
*H02P 9/08*    (2006.01)
*F03D 7/02*    (2006.01)
*H02P 101/15*  (2016.01)

(52) U.S. Cl.
CPC ............ *H02P 9/08* (2013.01); *F03D 7/028* (2013.01); *F05B 2270/303* (2013.01); *F05B 2270/32* (2013.01); *H02P 2101/15* (2015.01)

(58) Field of Classification Search
CPC ......... H02P 9/08; H02P 2101/15; H02P 3/22; H02P 9/00; F03D 7/028; F03D 7/0244; F05B 2270/303; F05B 2270/32; F05B 2270/335; Y02E 10/72
See application file for complete search history.

(56) References Cited

U.S. PATENT DOCUMENTS

2008/0191484 A1 *   8/2008   Okubo ............... F03D 7/00
                                                     290/55
2010/0133823 A1     6/2010   Schramm et al.

FOREIGN PATENT DOCUMENTS

| JP | 10179660 A    | * | 7/1998  |
| JP | 2005-269703 A |   | 9/2005  |
| JP | 2011-127480 A |   | 6/2011  |
| WO | 2012164637 A  |   | 12/2012 |

OTHER PUBLICATIONS

International Search Report issued in corresponding International Patent Application No. PCT/JP2022/010577, dated May 24, 2022, with English translation.

* cited by examiner

*Primary Examiner* — Joseph Ortega
(74) *Attorney, Agent, or Firm* — Rimon P.C.

(57) ABSTRACT

A power generation system includes a rotating body, a generator, a brake circuit, a voltage sensor, and a control device. When rotation speed of the rotating body exceeds a first threshold, the control device executes a brake operation by the brake circuit. When a release condition determined based on at least one of a value of a generated voltage detected by the voltage sensor and the rotation speed of the rotating body is satisfied after the rotation speed of the rotating body is lower than the first threshold, the control device stops the brake operation by the brake circuit.

4 Claims, 14 Drawing Sheets

| LINE | RESISTANCE VALUE | TEMPERATURE |
|---|---|---|
| L1 | X [Ω] | T1 [°C] |
| L2 | Y [Ω] | T2 [°C] |

FIG.9B $$\text{VOLTAGE VALUE AFTER CORRECTION} = \frac{\text{COMBINED RESISTANCE VALUE AFTER CORRECTION}}{\text{REFERENCE RESISTANCE VALUE}} \text{ MEASURED VOLTAGE VALUE}$$

POWER GENERATION SYSTEM

CROSS-REFERENCE OF RELATED APPLICATIONS

This application is the U.S. National Phase under 35 U.S.C. § 371 of International Patent Application No. PCT/JP2022/010577, filed on Mar. 10, 2022, which claims the benefit of Japanese Application No. 2021-045425, filed on Mar. 19, 2021, the entire disclosure of which Application is incorporated by reference herein.

TECHNICAL FIELD

The present disclosure relates to a power generation system, particularly to brake control in wind power and hydraulic power generation systems.

BACKGROUND ART

Conventionally, in a wind power generation system, when a strong wind is generated due to a typhoon or the like to become a rotation speed of a wind turbine too fast, a brake operation is started on the wind turbine from the viewpoint of mechanical protection, and the brake operation is continued until the wind speed is weakened. In such the wind power generation system, an anemometer may be used to determine whether the wind speed is sufficiently weakened to enable safe power generation. When the measurement value of the anemometer falls below a standard, the wind power generation system stops the brake operation from the state of continuously executing the brake operation, and rotates the wind turbine to execute normal power generation control. Hereinafter, stopping the brake operation from the state where the brake operation is continuously executed may be referred to as "releasing the brake". When the wind power generation system not including the anemometer, the wind power generation system stops the brake operation on a condition that a predetermined period elapses from a start of the brake operation. The same applies to the hydraulic power generation system.

In a wind turbine generator described in WO 2012/164637 (PTL 1), timing at which the electric brake operation is stopped is determined based on temperature of a main body surface of the wind turbine generator, temperature of a resistor, temperature of a cable, and the like after the electric brake operation is started when a strong wind is generated. Thus, in the wind turbine generator of PTL 1, frequent switching between the start and stop of the operation of the electric brake is efficiently prevented.

CITATION LIST

Patent Literature

PTL 1: WO 2012/164637

SUMMARY OF INVENTION

Technical Problem

When the electric brake is continuously operated based on the generation of the strong wind, power generation efficiency may decrease depending on the timing at which the operation of the electric brake is stopped. For example, in the case where the electric brake operation is stopped on the condition that the predetermined period elapses, when the predetermined period is too long, there is a possibility that a period in which normal power generation control cannot be started even though the wind speed is sufficiently weakened is generated, and the power generation efficiency decreases.

On the other hand, when the anemometer is used to determine the timing to stop the operation of the electric brake, it is easy to determine whether the wind speed is sufficiently weakened, but cost providing the anemometer increases. In addition, even when a water flow meter is provided in the hydraulic power generation system, the cost increases. Also in the wind power generation system of PTL 1, a plurality of temperature sensors are required for detecting temperatures of a plurality of heat sources, and there is a possibility that the cost increases.

The present disclosure has been made to solve such a problem, and an object of the present disclosure is to stop the brake operation at timing at which the power generation efficiency does not decrease while preventing the increase in the cost in the power generation system including the electric brake.

Solution to Problem

A control device according to the present disclosure is a control device that controls a power generation system supplying power to a supply target. The power generation system includes a rotating body, a generator, a brake circuit, a voltage sensor, and a control device. The generator is rotated by the rotating body to generate three-phase AC power. The brake circuit is connected to the generator and generates braking force on the rotating body by short-circuiting the phases. The voltage sensor detects a value of a generated voltage of the generator. The control device controls the brake circuit. When rotation speed of the rotating body exceeds a first threshold, the control device executes the brake operation by the brake circuit. When a release condition determined based on at least one of the value of the generated voltage detected by the voltage sensor and the rotation speed of the rotating body is satisfied after the rotation speed of the rotating body is lower than the first threshold, the control device stops the brake operation by the brake circuit.

Advantageous Effects of Invention

The control device of the power generation system according to the present disclosure decelerates the rotating body using the brake circuit based on excessive rotation speed of the rotating body exceeding the first threshold. Thereafter, the control device estimates the wind speed based on the generated voltage of the generator, and releases the brake by the brake circuit when estimating that the rotation speed does not exceed the first threshold again even when the brake by the brake circuit is released. Thus, the control device of the power generation system can estimate the wind speed using the voltage sensor required for power generation control without providing the anemometer, the temperature sensor, or the like. Accordingly, in the control device of the power generation system, the brake can be released at the timing when the power generation efficiency does not decrease while the increase in the cost is prevented.

BRIEF DESCRIPTION OF DRAWINGS

FIG. 8B is a view illustrating that a relationship between the voltage and the wind speed changes due to a change in a resistance value.

FIG. 9B is a view illustrating an example in which a detection value of a voltage sensor VS is corrected based on temperature.

DESCRIPTION OF EMBODIMENTS

Figure 1:
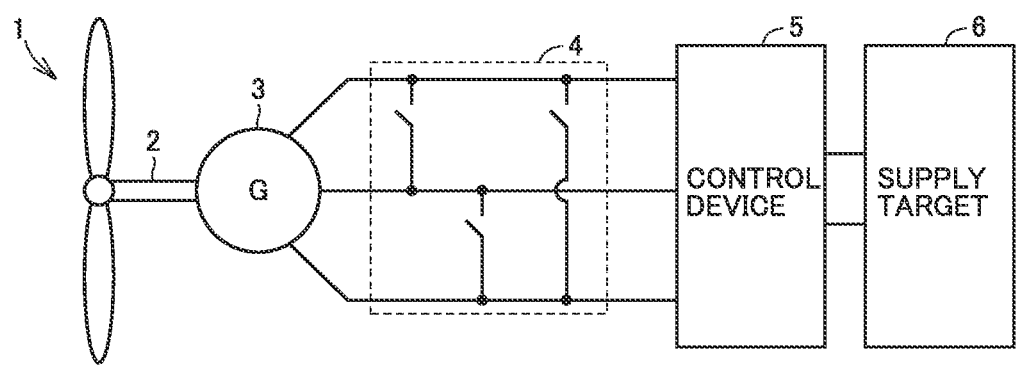
FIG. 1 is a schematic diagram illustrating a configuration of a wind power generation system according to an embodiment.

With reference to the drawings, an embodiment of the present disclosure will be described in detail below. In the drawings, the same or corresponding part is denoted by the same reference numeral, and the description thereof will not be repeated.

EMBODIMENT

FIG. 1 is a schematic diagram illustrating a configuration of a wind power generation system 100 according to an embodiment. Wind power generation system 100 is an example of a horizontal axis type (propeller type) wind power generation system. As illustrated in FIG. 1, wind power generation system 100 includes a wind turbine 1, a generator 3, and a control device 5. When the power generation system of the embodiment is a hydraulic power generation system, a water turbine is provided instead of wind turbine 1.

Wind turbine 1 includes a main shaft 2. Generator 3 includes a three-phase synchronous generator in which a permanent magnet is used. Generator 3 is fastened to main shaft 2 by a coupling or the like. As required, a speed-increasing gear may be provided between main shaft 2 and generator 3. Wind turbine 1 is rotated by kinetic energy of wind, and main shaft 2 rotates generator 3. In wind power generation system 100, control device 5 is connected to generator 3 through a brake circuit 4. Generator 3 sends generated power to control device 5 through brake circuit 4. The generated power is converted into DC power or AC power having a different frequency by control device 5 and then supplied to a supply target 6. For example, supply target 6 is a battery or a system power supply.

Figure 2:
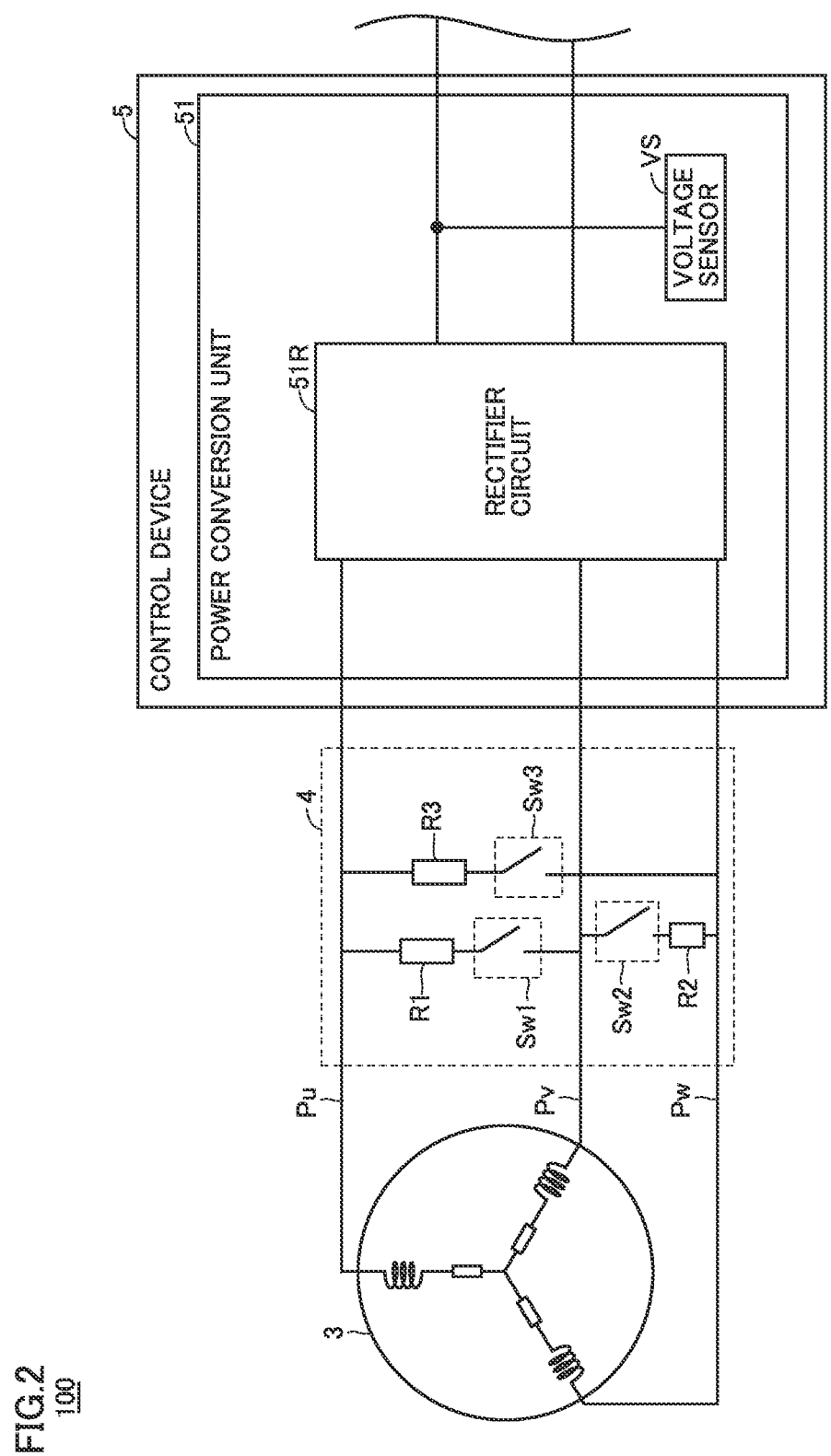
FIG. 2 is a view illustrating a brake operation by a brake circuit.

FIG. 2 is a view illustrating a brake operation by brake circuit 4. Generator 3 outputs the generated power generated by a rotating operation to each of a power line Pu, a power line Pv, and a power line Pw as three-phase (U-phase, V-phase, and W-phase) generated power. Control device 5 includes a power conversion unit 51. A rectifier circuit 51R included in power conversion unit 51 receives the three-phase generated power from each of power line Pu, power line Pv, and power line Pw. Rectifier circuit 51R is an alternate current (AC)/direct current (DC) converter. Rectifier circuit 51R converts the three-phase generated power into DC power. Voltage sensor VS detects the generated voltage of generator 3.

Brake circuit 4 includes a switch Sw1, a switch Sw2, a switch Sw3, a resistor R1, a resistor R2, and a resistor R3. Switch Sw1 and resistor R1 are connected in series between power line Pu and power line Pv. Switch Sw2 and resistor R2 are connected in series between power line Pv and power line Pw. Switch Sw3 and resistor R3 are connected in series between power line Pw and power line Pu.

Control device 5 electrically generates braking force by closing switches Sw1 to Sw3 of brake circuit 4 to decelerate rotation speed of wind turbine 1. By short-circuiting the phases of generator 3 by brake circuit 4, current due to an electromotive voltage generated by power generation flows through an armature of generator 3. Electromagnetic induction generated by the current generates the braking force acting in a direction opposite to a direction in which the armature rotates by the wind. Hereinafter, brake in which phases are short-circuited by brake circuit 4 to apply the braking force to wind turbine 1 is referred to as "electric brake". In addition, short-circuiting between the phases by brake circuit 4 is referred to as "operating the electric brake". Furthermore, releasing switches Sw1 to Sw3 of brake circuit 4 is referred to as "stopping the electric brake" and "releasing the brake".

Figure 3:
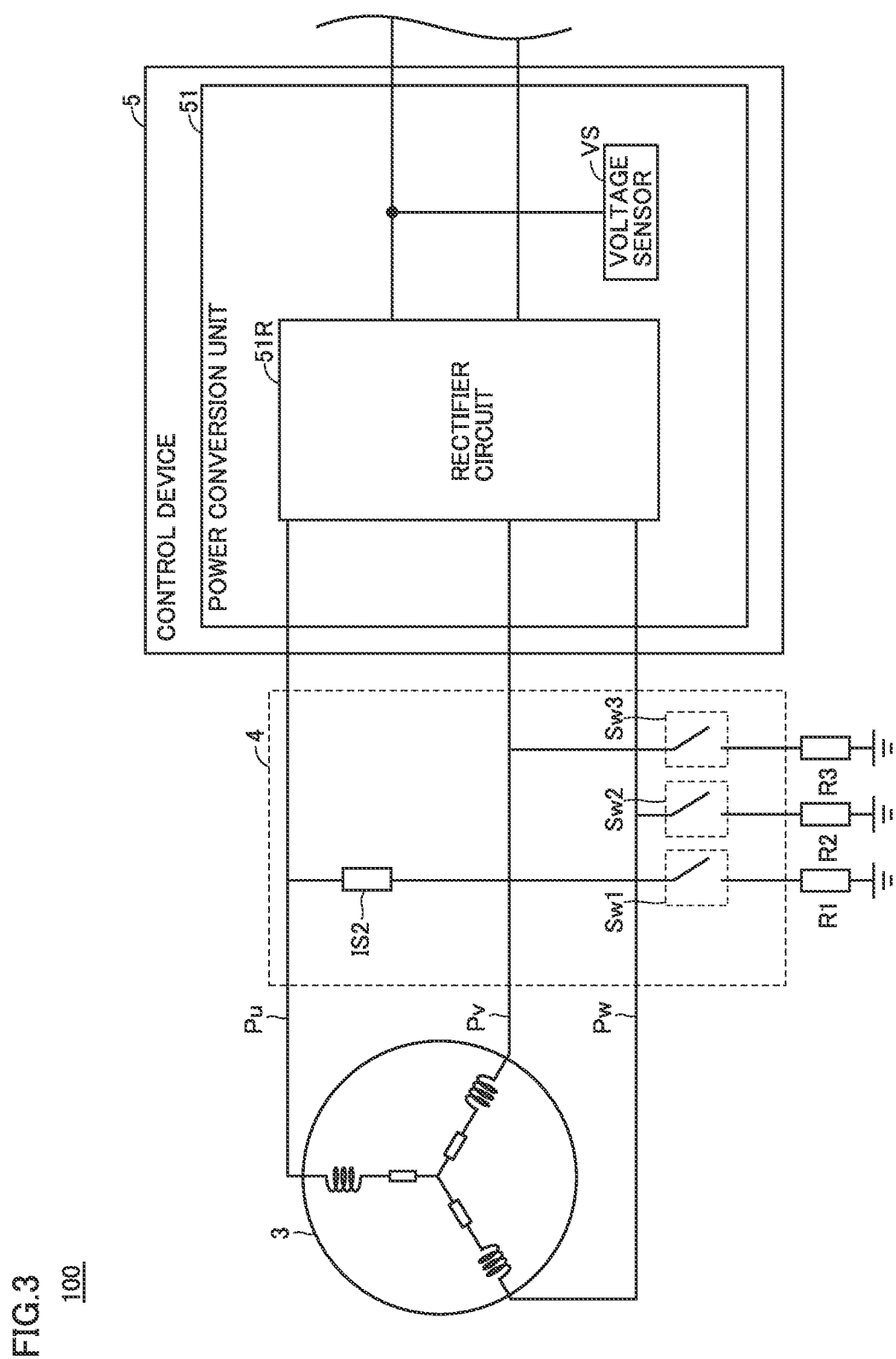
FIG. 3 is a view illustrating a configuration of a modification of the brake circuit.

Although the configuration in which the phases of power line Pu, power line Pv, and power line Pw are short-circuited in order to operate the electric brake has been described in FIG. 2, the electric brake may be operated by short-circuiting power lines Pu to Pw and the ground as illustrated in FIG. 3.

FIG. 3 is a view illustrating a configuration of a modification of the brake circuit. In brake circuit 4 of FIG. 3, the configuration of brake circuit 4 in which switches Sw1 to Sw3 are provided between power lines Pu, Pw, Pv and the ground is illustrated. Also in the configuration of FIG. 3, switches Sw1 to Sw3 are closed by a control signal from control device 5, whereby the phases of generator 3 are short-circuited through the ground and the current flows through the armature. Therefore, the braking force can be generated with respect to wind turbine 1. Brake circuit 4 includes a current sensor IS2 that measures the current value.

Figure 4:
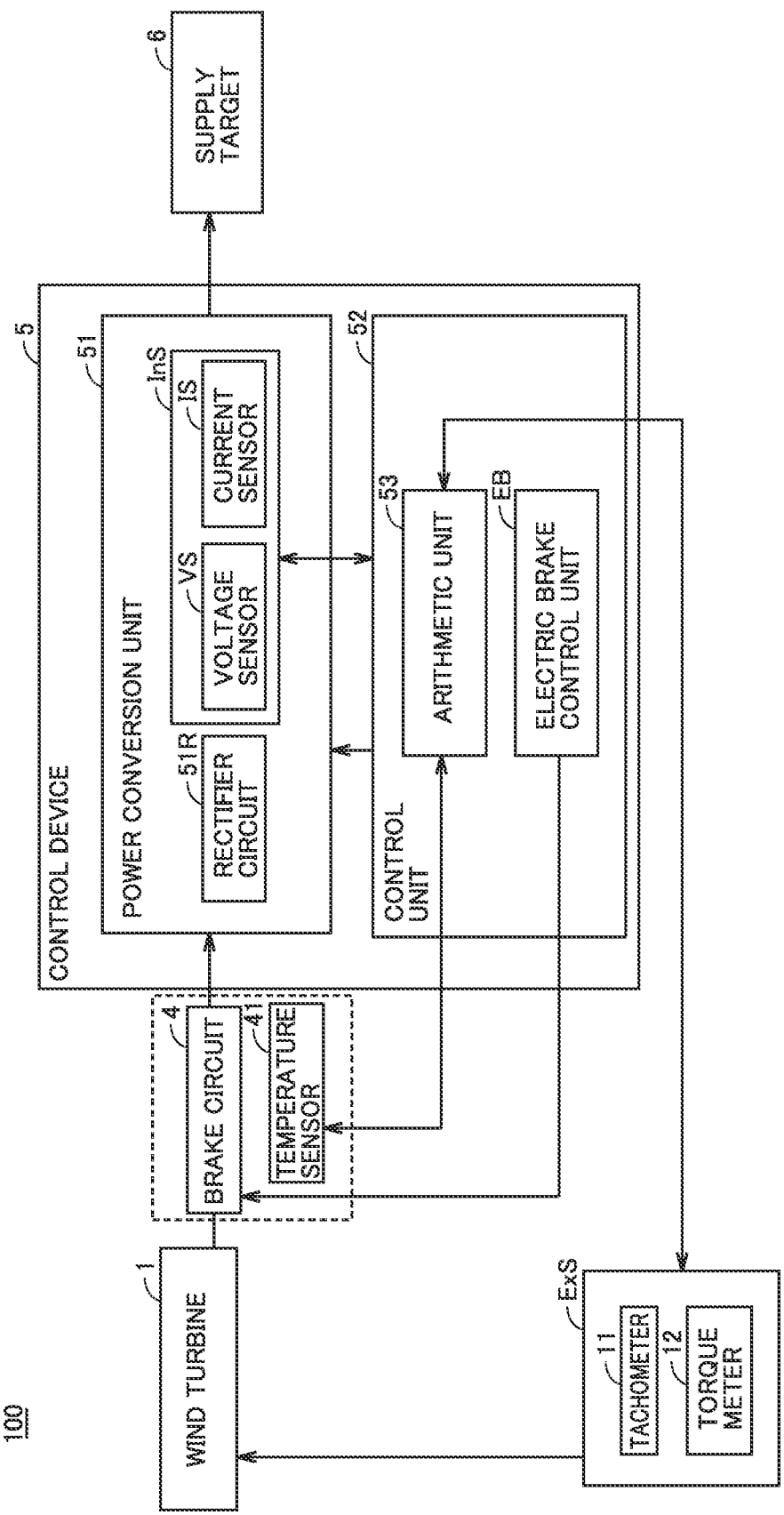
FIG. 4 is a block diagram illustrating a function of the wind power generation system.

FIG. 4 is a block diagram illustrating a function of wind power generation system 100. Control device 5 includes power conversion unit 51 and a control unit 52. Power conversion unit 51 converts the generated power received from power lines Pu, Pv, Pw in FIG. 2 into a format supplying the generated power to supply target 6.

In addition, power conversion unit 51 includes an internal sensor unit InS and rectifier circuit 51R. Internal sensor unit InS includes voltage sensor VS and a current sensor IS. Voltage sensor VS detects the generated voltage of generator 3 after rectification. Current sensor IS detects the current flowing through the circuit in power conversion unit 51. Rectifier circuit 51R converts the three-phase generated power received by control device 5 into DC power.

Control unit 52 includes an electric brake control unit EB and an arithmetic unit 53. Arithmetic unit 53 includes a central processing unit (CPU) and a memory (both not illustrated). As described with reference to FIG. 1, in wind power generation system 100, the phases are short-circuited by brake circuit 4 to generate the braking force with respect to the rotation of wind turbine 1. That is, when switches Sw1 to Sw3 of brake circuit 4 are closed by the control signal from electric brake control unit EB, the braking force against the rotation of wind turbine 1 is generated.

Arithmetic unit 53 receives detection signals from an external sensor unit ExS and a temperature sensor 41. External sensor unit ExS includes a tachometer 11 and a torque meter 12. Tachometer 11 measures the rotation speed of wind turbine 1. Torque meter 12 detects torque generated in wind turbine 1 by wind. Temperature sensor 41 detects the temperature of brake circuit 4 including resistors R1 to R3. External sensor unit ExS may be configured to be able to detect a charge amount of supply target 6 when supply target 6 is a battery.

Figure 5:
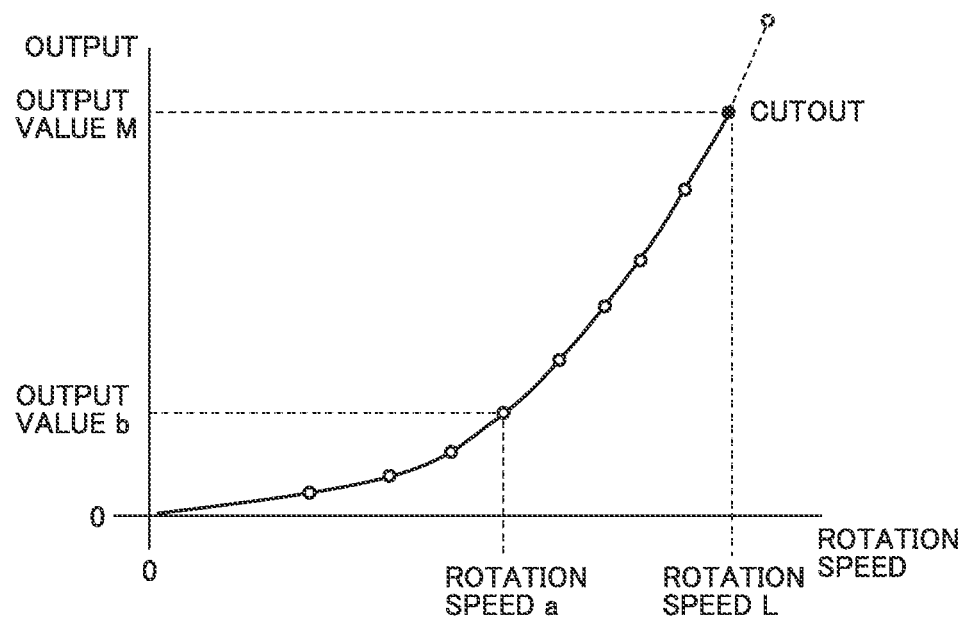
FIG. 5 is a view illustrating map control.

FIG. 5 is a view illustrating map control. A horizontal axis in FIG. 5 represents the rotation speed of wind turbine 1, and a vertical axis in FIG. 5 represents an output value (generated power) of generator 3. In the map control, the output value of generator 3 is controlled by adjusting a duty ratio in performing switching control to a predetermined duty ratio according to the rotation speed. Thus, control device 5 can uniquely determine the output value of generator 3 for a certain rotation speed. For example, when wind turbine 1 is rotating at rotation speed a, generator 3 outputs an output value b.

Rotation speed L in FIG. 5 is a rotation speed at which cutout is executed. The cutout is a mechanical and electrical protection function of preventing excessive rotation of wind turbine 1. When wind turbine 1 rotates at speed higher than specific speed from a mechanical and electrical viewpoint of wind turbine 1, mechanical and electrical reliability of wind turbine 1 decreases. Hereinafter, a state in which wind turbine 1 is rotating at the rotation speed at which the mechanical and electrical reliability are lowered may be referred to as "overrotation". In wind power generation system 100, in order to prevent the overrotation of wind turbine 1, the braking force is generated on wind turbine 1 to decelerate wind turbine 1. Rotation speed L is previously determined based on an allowable rotation speed determined from a mechanical and electrical specification of wind turbine 1. Rotation speed L may be set to a rotation speed slower than the allowable rotation speed instead of the allowable rotation speed itself. Rotation speed L is desirably set as speed at which the electric brake can be operated continuously to sufficiently decelerate. For example, it is also conceivable that the mechanical strength of wind turbine 1 is high and rotation speed L can be set to a high speed. However, when rotation speed L is too fast when the cutout is executed, the torque applied by the wind exceeds the braking force of the electric brake, and there is a possibility that the rotation speed of wind turbine 1 cannot be sufficiently decelerated. For this reason, rotation speed L is set as speed at which at least the rotation speed of wind turbine 1 can be decelerated when the electric brake is operated.

Furthermore, timing at which the cutout is executed may be determined based on an electrically allowable range (a rated voltage, a rated current, and the like) determined in power conversion unit 51. This is because when the voltage exceeding the allowable range is applied to power conversion unit 51, a failure of power conversion unit 51 may be generated. In this case, the timing of executing the cutout is determined according to whether the value of an output value M is within the allowable range of power conversion unit 51.

As described above, in wind power generation system 100, when strong wind is generated, the rotation speed of wind turbine 1 is decelerated based on the rotation speed of wind turbine 1 or the generated power of generator 3 from the viewpoint of mechanical and electrical protection. That is, when wind turbine 1 rotates at rotation speed L, control device 5 short-circuits the phases of generator 3 by brake circuit 4 to start the operation of the electric brake. Control device 5 of wind power generation system 100 of the embodiment continuously operates the electric brake until the release condition is satisfied after the operation of the electric brake is started.

Due to the characteristic of the electric brake, when wind turbine 1 receives the wind while the phases are short-circuited by brake circuit 4, the rotation of wind turbine 1 does not completely stop. Because the electric brake operation is continuously operated after the cutout is executed, the rotation speed of wind turbine 1 gradually decreases from rotation speed L. Thereafter, when the braking force applied by the electric brake and the torque rotating main shaft 2 by the wind are balanced, an equilibrium state is obtained. As described above, the electric brake generates the braking force using the electric energy acting on the armature of generator 3 by receiving the wind.

Even when wind turbine 1 is in the equilibrium state, wind turbine 1 continues to rotate at a relatively slow rotation speed due to the characteristic of the electric brake having internal resistance. The rotation speed of wind turbine 1 in the equilibrium state is affected by the wind speed. That is, when the wind speed in the equilibrium state is high, the torque rotating main shaft 2 increases, and wind turbine 1 continues to rotate while maintaining the predetermined speed even in the equilibrium state. On the other hand, when the wind speed in the equilibrium state is weak, the torque rotating main shaft 2 is weakened, and wind turbine 1 rotates at the speed close to a stopped state in the equilibrium state. As described above, the electric brake is operated based on the generation of the strong wind, and the rotation of wind turbine 1 can be maintained at the rotation speed lower than rotation speed L, so that wind turbine 1 can be mechanically and electrically protected.

Here, when the timing at which the electric brake is released is not appropriate, there is a possibility that the power generation efficiency of wind power generation system 100 is lowered or wind turbine 1 is damaged. For example, when the timing at which the electric brake is released is late, there is a case where wind turbine 1 cannot be rotated although the wind speed is sufficiently weakened to the extent that normal power generation control can be performed. In this case, although there is no possibility that wind turbine 1 rotates excessively because the wind speed is sufficiently weakened, the electric brake is continuously operated, and the normal power generation control cannot be performed. Accordingly, power generation efficiency is reduced.

When the timing at which the electric brake is released is early, the rotation of wind turbine 1 is started although the wind speed is not sufficiently weakened. In wind turbine 1 in which the braking force is no longer applied, the rotation speed is accelerated by the strong wind, and wind turbine 1 is overrotated, and the cutout is executed again. That is, when the timing at which the electric brake is released is too early, processing for releasing the electric brake and the cutout are frequently repeated. As a result, the start and stop of the operation of the electric brake are frequently repeated, and the acceleration and deceleration of the rotation of wind turbine 1 are repeated. Thus, opening and closing operations of switches Sw1 to Sw3 are excessively repeated, and the degradation of brake circuit 4 can be promoted. In addition, the degradation of wind turbine 1 can be promoted by excessively repeating the acceleration and deceleration of wind turbine 1.

Therefore, in the wind power generation system 100, it is desirable to release the operation of the electric brake at the time when the wind speed is weakened to such an extent that the wind turbine 1 does not overrotate. It is conceivable to use an anemometer in order to determine the wind speed, but cost can increase because the anemometer is relatively expensive. Control determining the timing at which the electric brake is released without using the anemometer in wind power generation system 100 of the embodiment will be described below.

Figure 6A:
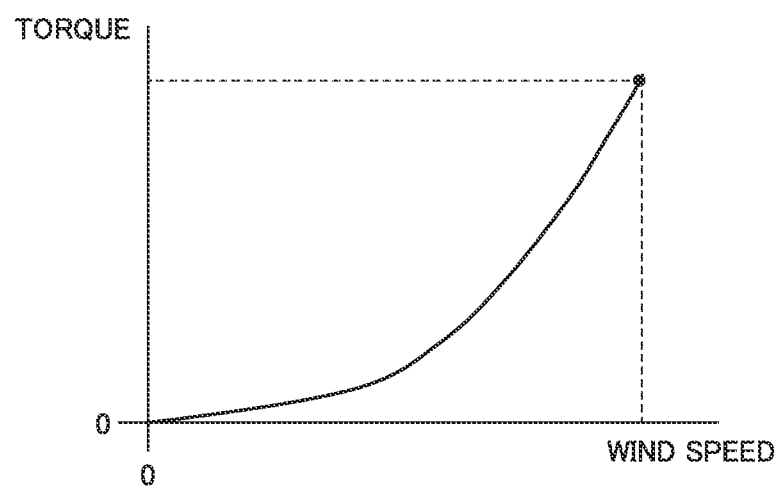
FIG. 6A is a view illustrating a relationship between wind speed and voltage in wind power generation.
Figure 6B:
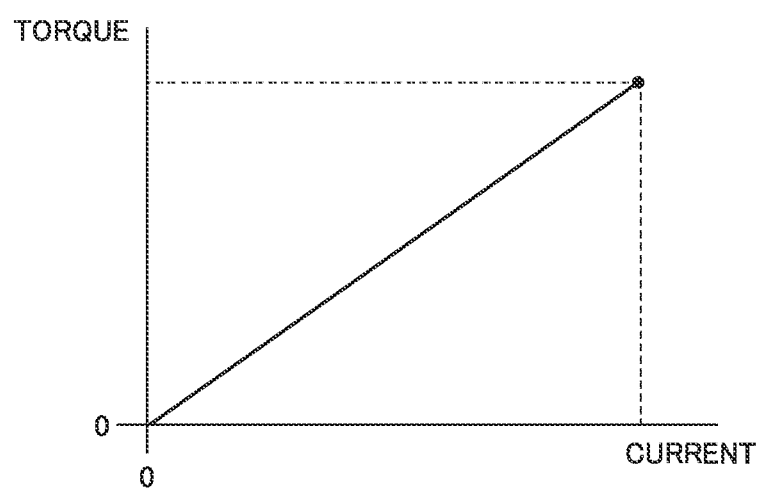
FIG. 6B is a view illustrating a relationship between wind speed and voltage in wind power generation.
Figure 6C:
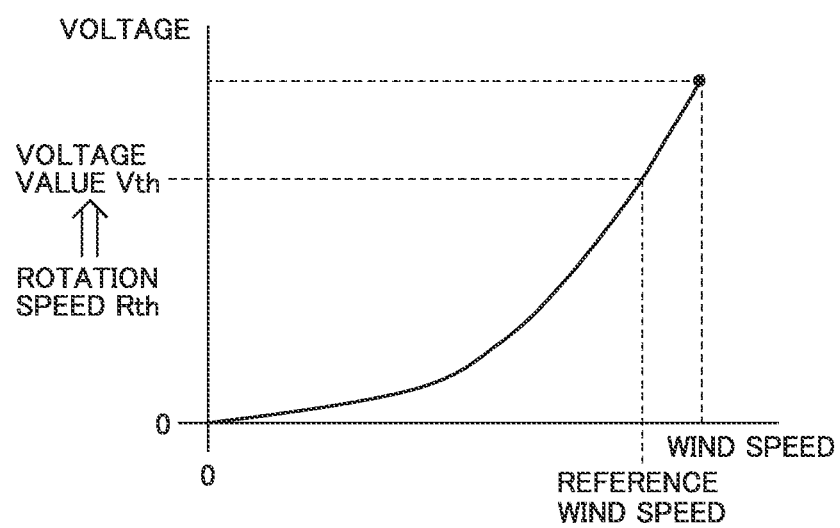
FIG. 6C is a view illustrating a relationship between wind speed and voltage in wind power generation.

FIG. 6A, FIG. 6B and FIG. 6C are views illustrating a relationship between the wind speed and the voltage in the wind power generation. FIG. 6A, FIG. 6B and FIG. 6C are views illustrating a relationship with the torque acting on main shaft 2 by the wind. The wind speed is a wind speed around wind turbine 1. The torque is torque acting on main shaft 2 included in wind turbine 1 by the wind. The torque is detected by torque meter 12. As illustrated in FIG. 6A, in the wind power generation, the torque acting on main shaft 2 by the wind is generally proportional to the square of the wind speed.

FIG. 6B is a view illustrating a relationship between the current and the torque. The current in FIG. 6B is current generated by generator 3. As illustrated in FIG. 6B, in the wind power generation, the torque acting on main shaft 2 by the wind is generally proportional to the current flowing through generator 3. When the resistance value is constant, the current is proportional to the voltage. Consequently, considering the relationship between the detection value of voltage sensor VS and the wind speed based on the relationships in FIGS. 6A and 6B, the relationship in which the voltage is proportional to the square of the wind speed can be derived as illustrated in FIG. 6C. Accordingly, using the relationship between the voltage and the wind speed in FIG. 6C, the wind speed can be uniquely estimated from the detection value of voltage sensor VS. As described above, due to the characteristic of the electric brake, when the electric brake is continuously operated after the brake operation is executed by the cutout and when the strong wind is generated, the rotation of wind turbine 1 is not completely stopped and continues to rotate at the relatively slow speed. Accordingly, even when the electric brake is held, the relationship between the voltage and the wind speed in FIG. 6C is established.

Reference wind speed in FIG. 6C means a wind speed at which wind turbine 1 does not accelerate to rotation speed L even when the electric brake is released in the equilibrium state after the brake operation is executed by the cutout. That is, control device 5 can determine that the normal power generation control can be performed without frequently repeating the start and stop of the operation of the electric brake even when the electric brake is released when the rotation speed of wind turbine 1 becomes the reference speed. The reference wind speed is appropriately determined by an actual machine experiment or simulation. As illustrated in FIG. 6C, the detection value of voltage sensor VS is a voltage value Vth at the reference wind speed. Therefore, the release condition that is the condition releasing the electric brake is a condition that the detection value of voltage sensor VS is lower than voltage value Vth.

In wind power generation system 100 of the embodiment, whether the wind speed is lower than the reference wind speed is determined from the detection value of voltage sensor VS using the relationship between the detection value of voltage sensor VS and the wind speed in FIG. 6C without using the anemometer. Thus, in wind power generation system 100, the electric brake operated due to the generation of the strong wind can be released at the appropriate timing. When the electric brake is released if the wind speed is greater than or equal to the reference wind speed, the operation the start and stop of the electric brake is frequently repeated to promote the degradation of wind turbine 1.

In addition, when the operation of the electric brake is not released even though the wind speed is lower than the reference wind speed, the normal power generation control cannot be performed, and the power generation efficiency decreases. In wind power generation system 100, the decrease in the power generation efficiency can also be prevented by releasing the brake at the timing when the wind speed falls below the reference wind speed. Because voltage sensor VS used for the power conversion is used without providing the anemometer, wind power generation system 100 that performs the brake control can be implemented while suppressing an increase in cost.

Furthermore, because the number of turns of the coil of generator 3 is constant, the rotation speed of the rotor of generator 3 is proportional to the induced electromotive force. That is, control device 5 can derive the wind speed based on the rotation speed measured by tachometer 11 without using voltage sensor VS. For example, as illustrated in FIG. 6C, control device 5 can determine that the detection value of voltage sensor VS is voltage value Vth when the rotation speed reaches rotation speed Rth. Wind power generation system 100 can determine whether the wind speed is the reference wind speed using rotation speed Rth.

Figure 7:
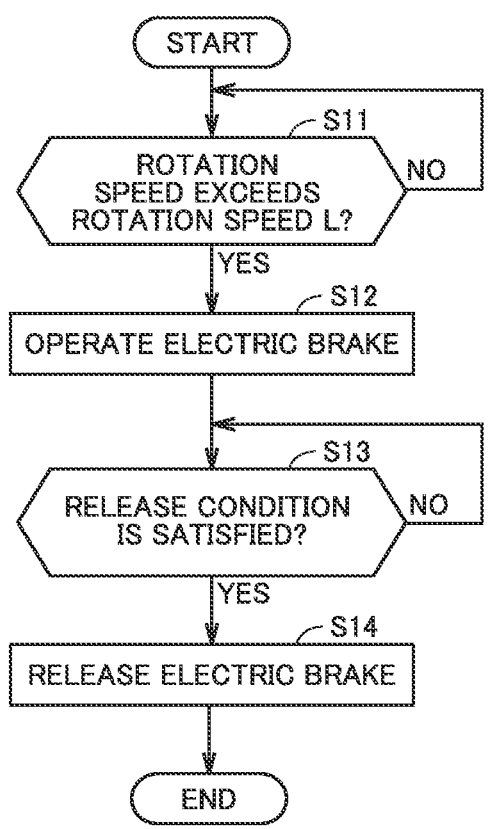
FIG. 7 is a flowchart illustrating an example in which an electric brake is released using a voltage sensor.

FIG. 7 is a flowchart illustrating an example in which the electric brake is released using voltage sensor VS after the start of the brake operation by the cutout. Control device 5 determines whether the rotation speed of wind turbine 1 exceeds predetermined rotation speed L (step S11). When the rotation speed of wind turbine 1 is less than or equal to rotation speed L (NO in step S11), control device 5 repeats the processing of step S11. That is, wind power generation system 100 performs the normal power generation control assuming that no strong wind is not generated.

When the rotation speed of wind turbine 1 exceeds rotation speed L (YES in step S11), control device 5 starts the operation of the electric brake (step S12). That is, control device 5 controls electric brake control unit EB to close switches Sw1 to Sw3 of the brake circuit. The electric brake is configured to generate the braking force sufficient to decelerate the rotation speed of wind turbine 1 rotating at rotation speed L. Thus, the rotation speed of wind turbine 1 becomes the speed lower than rotation speed L.

In control device 5, in the state where the electric brake is continuously operated after step S12, as described above, the braking force and the torque applied by the wind are in the equilibrium state, and wind turbine 1 rotates at the relatively slow speed. Control device 5 determines whether the release condition is satisfied based on the detection value or the rotation speed of voltage sensor VS in the equilibrium state (step S13).

The release condition in the embodiment is a condition that the detection value of voltage sensor VS is lower than voltage value Vth. The release condition may be a condition that the value of the rotation speed is lower than rotation speed Rth. In addition, the release condition may be a condition that both the condition that the detection value of voltage sensor VS is lower than voltage value Vth and the condition that the value of the rotation speed is lower than rotation speed ThR are satisfied.

Control device 5 determines whether the detection value of voltage sensor VS detected by voltage sensor VS is lower than voltage value Vth. When the detected value of voltage sensor VS is greater than or equal to voltage value Vth (NO in step S13), control device 5 repeats the processing of step S13. When the detection value of voltage sensor VS is lower than voltage value Vth (YES in step S13), control device 5 determines that the release condition is satisfied to release the electric brake (step S14). That is, wind power generation system 100 resumes the normal power generation control to supply the power to supply target 6.

When the release condition is a condition that the value of the rotation speed is lower than rotation speed Rth, control device 5 determines that the release condition is satisfied in the case where the rotation speed measured by tachometer 11 is less than or equal to rotation speed Rth in the equilibrium state in which the electric brake is operating. Alternatively, control device 5 determines that the release condition is satisfied when both the condition that the detection value of voltage sensor VS is less than or equal to voltage value Vth and the condition that the detection value of voltage sensor VS is less than or equal to rotation speed Rth are satisfied.

As described above, in wind power generation system 100 of the embodiment, when the release condition determined based on at least one of the detection value of voltage sensor VS and the rotation speed of wind turbine 1 is satisfied during the execution of the brake operation by the cutout, the brake operation by brake circuit 4 is released. Thus, the electric brake at the appropriate timing can be released while preventing the increase in the cost without using the anemometer, so that the decrease in the power generation efficiency can be prevented.

First Modification

As described above, the configuration, in which the wind speed is estimated based on the detection value of voltage sensor VS in the equilibrium state and the brake is released based on whether the estimated wind speed is lower than the reference wind speed, has been described in the embodiment. In a first modification, a configuration in which the wind speed from the detection value of voltage sensor VS focusing on the resistance of brake circuit 4 is more accurately estimated will be described.

Figure 8A:
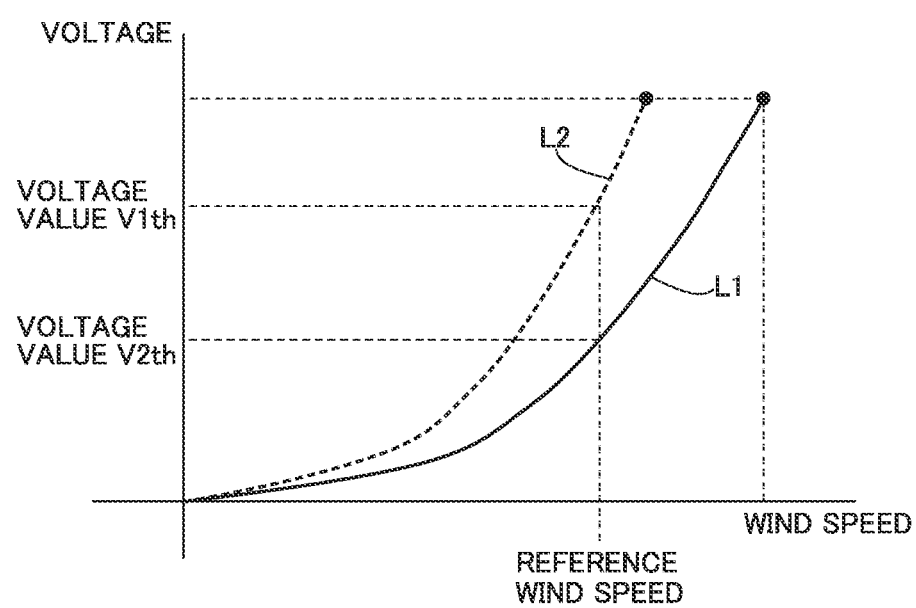
FIG. 8A is a view illustrating that a relationship between the voltage and the wind speed changes due to a change in a resistance value.

FIG. 8A and FIG. 8B are views illustrating that the relationship between the voltage and the wind speed changes due to the change in the resistance value. As described above, wind power generation system 100 estimates the reference wind speed based on the detection value of voltage sensor VS. As described in FIG. 6C, the detection value of voltage sensor VS is proportional to the square of the wind speed. However, a shape of a curve indicating the relationship between the detection value of voltage sensor VS and the wind speed as illustrated in FIG. 6C changes under an influence of various external factors. For example, when a combined resistance value of resistors R1 to R3 included in brake circuit 4 varies, the line indicating the relationship between the detection value of voltage sensor VS and the wind speed changes to a line L1, a line L2, or the like as illustrated in FIG. 8A.

The resistance value of each of resistors R1 to R3 may vary depending on the temperature around brake circuit 4. Therefore, the combined resistance value of resistors R1 to R3 also changes depending on the temperature around brake circuit 4. In general, the resistance value of the resistance increases as the temperature increases, and decreases as the temperature decreases. As illustrated in FIG. 8A, line L1 is a curve indicating the relationship between the detection value of voltage sensor VS and the wind speed when the temperature around brake circuit 4 is a temperature T1. At temperature T1, the combined resistance value of resistors R1 to R3 is X. Line L2 is a curve indicating the relationship between the detection value of voltage sensor VS and the wind speed when the temperature around brake circuit 4 is a temperature T2 lower than temperature T1. At temperature T2, the combined resistance value of resistors R1 to R3 becomes Y smaller than X.

Figure 9A:
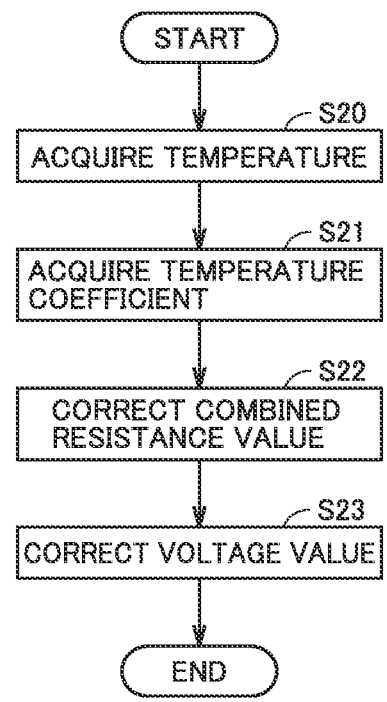
FIG. 9A is a view illustrating an example in which a detection value of a voltage sensor VS is corrected based on temperature.

As described above, because the combined resistance value of resistors R1 to R3 of brake circuit 4 changes depending on the temperature, an error may be generated when the wind speed is estimated only from the detection value of voltage sensor VS. Accordingly, control device 5 of the first modification estimates the wind speed in consideration of the temperature. FIG. 9A and FIG. 9B are views illustrating an example in which the detection value of voltage sensor VS is corrected based on the temperature. FIG. 9A is a flowchart correcting the detection value of voltage sensor VS. Control device 5 executes the flowchart in FIG. 9A in step S13 of FIG. 7. Control device 5 acquires the temperature detected by temperature sensor 41 (step S20). After acquiring the temperature, control device 5 acquires a resistance temperature coefficient corresponding to the acquired temperature (step S21). The resistance temperature coefficient is a coefficient indicating a rate of change in the resistance value of resistors R1 to R3 due to the temperature change.

Control device 5 corrects the combined resistance value based on the resistance temperature coefficient (step S22). After correcting the combined resistance value, control device 5 corrects the detection value of voltage sensor VS using a calculation formula in FIG. 9B.

Thus, in wind power generation system 100, the wind speed can be estimated more accurately. That is, control device 5 can estimate the wind speed more accurately from the detection value of voltage sensor VS in consideration of the change in the resistance value due to the temperature change, so that the electric brake can be released at the appropriate timing.

Second Modification

As described above, the configuration in which wind power generation system 100 estimates the wind speed based on the relationship between the parameters such as the voltage, the torque, the current, the rotation speed, the resistance value, and the temperature without using the anemometer has been described. However, in an actual environment, the relationship between the above-described parameters is affected by various external factors other than the above-described parameters. It is difficult to consider all kinds of these external factors in a wide range. Accordingly, in a second modification, an example in which more accurate estimation is performed using artificial intelligence that finds a feature of the relationship with each parameter using teacher data will be described.

Figure 10:
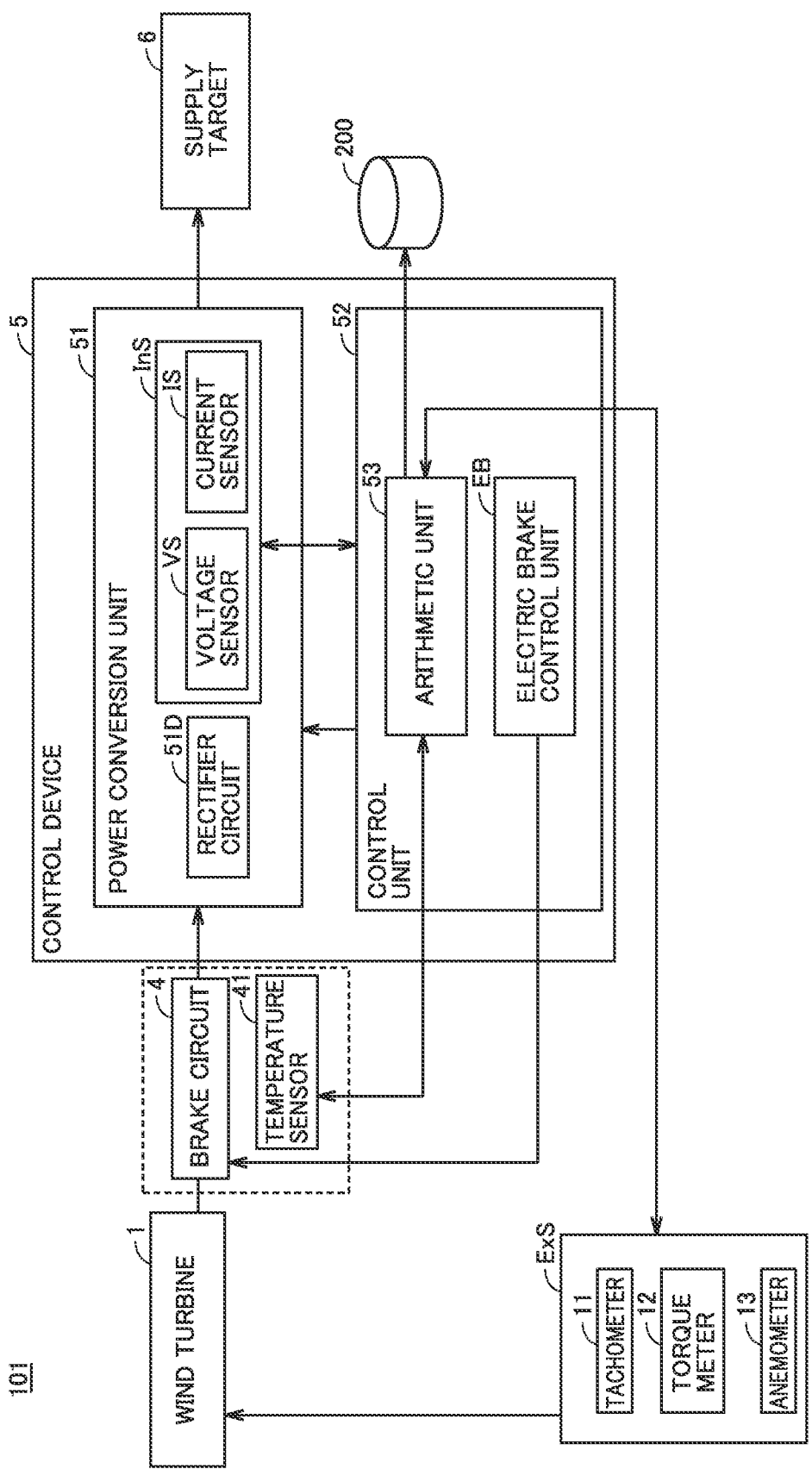
FIG. 10 is a view illustrating a configuration of a wind power generation system acquiring a learning model.

FIG. 10 is a view illustrating a configuration of a wind power generation system 101 acquiring a learning model. In the configuration of wind power generation system 101 in FIG. 10, the same configuration as that of wind power generation system 100 will not be described again. External sensor unit ExS of wind power generation system 101 includes an anemometer 13.

Wind power generation system 101 generates learning data. That is, arithmetic unit 53 of wind power generation system 101 accumulates the wind speed actually measured by anemometer 13 in a database 200. Arithmetic unit 53 of wind power generation system 101 further acquires the detection value of voltage sensor VS at the same time as the time when the wind speed is measured, the temperature detected by temperature sensor 41, the rotation speed measured by tachometer 11, and the torque detected by torque meter 12, and accumulates them in database 200 as the learning data. Database 200 is stored in a server or the like separate from wind power generation system 101.

Database 200 stores the actual wind speed, the detection value of voltage sensor VS at the same time, and the like. That is, in database 200, the detection value of voltage sensor VS is associated with the wind speed. Similarly, in database 200, the rotation speed is associated with the wind speed. Wind power generation system 100 of the embodiment generates the learning model using the artificial intelligence from the learning data generated by wind power generation system 101. With the generated learning model, the wind speed can be estimated with higher accuracy using the parameter such as the detection value of voltage sensor VS as an input value. Thus, when the feature can be further found from the relationship between the parameters using the artificial intelligence, in wind power generation system 100, the accuracy of the estimated wind power value can be improved using the learning model.

It should be considered that the disclosed embodiment is an example in all respects and not restrictive. The scope of the present invention is defined by not the description above, but the claims, and it is intended that all modifications within the meaning and scope equivalent to the claims are included in the present invention. In addition, the control device of the present invention can be applied not only to the wind power generation system but also to the hydraulic power generation system and the like.

REFERENCE SIGNS LIST

1: wind turbine, 2: main shaft, 3: generator, 4: brake circuit, 5: control device, 6: supply target, 11: tachometer, 12: torque meter, 13: anemometer, 41: temperature sensor, 51: power conversion unit, 51R: rectifier circuit, 52: control unit, 53: arithmetic unit, 100, 100A, 101: wind power generation system, 200: database, EB: electric brake control unit, ExS: external sensor unit, IS, IS2: current sensor, InS: internal sensor unit, L, Rth, a: rotation speed, L1, L2: line, M, b: output value, Pu, Pv, Pw: power line, R1 to R3: resistor, Sw1 to Sw3: switch, T1 to T3: temperature, Vth: voltage value, VS: voltage sensor, X, Y, Z: combined resistance value, c1 to c3: coil, r1 to r3: internal resistance

The invention claimed is:

1. A power generation system that supplies power to a supply target, the power generation system comprising:
   a rotating body;
   a generator that is rotated by the rotating body and generates three-phase AC power;
   a brake circuit that is connected to the generator and configured to generate braking force on the rotating body by short-circuiting phases;
   a temperature sensor that detects a temperature of the brake circuit; and
   a control device having a voltage sensor and a control unit, the voltage sensor detecting a value of a generated voltage of the generator, the control unit obtaining a value of the generated voltage detected by the voltage sensor,
   wherein the control unit is configured to:
      performs a brake operation by the brake circuit when rotation speed of the rotating body exceeds a first threshold; and
      stops the brake operation by the brake circuit when a release condition determined based on at least one of the value of the generated voltage detected by the voltage sensor and the rotation speed is satisfied after the rotation speed is lower than the first threshold,
   wherein the release condition is a condition that the value of the generated voltage falls below a second threshold, and
   wherein the control unit is configured to determine the second threshold according to the detected temperature of the brake circuit.

2. The power generation system according to claim 1, wherein
   the rotating body is rotated by wind, and
   the control unit is configured to estimate the second threshold based on learning data in which a wind speed at a place where the rotating body is installed is associated with the generated voltage.

3. The power generation system according to claim 1, wherein the release condition is a condition that the value of the rotation speed falls below a third threshold.

4. The power generation system according to claim 3, wherein
   the rotating body is rotated by wind, and
   the control unit is configured to estimate the third threshold based on learning data in which a wind speed at a place where the rotating body is installed is associated with the rotation speed.

* * * * *